Feb. 5, 1946.  D. L. RANKIN  2,394,104
ADJUSTING SCREW
Filed March 10, 1943
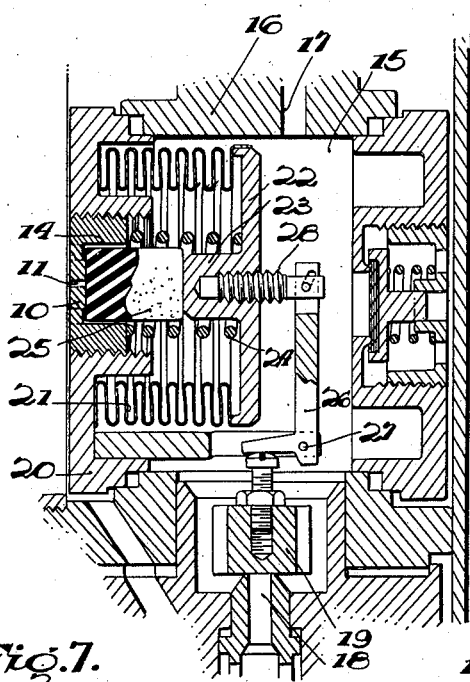
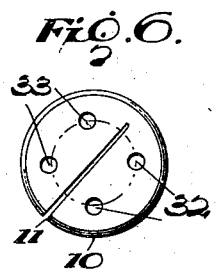
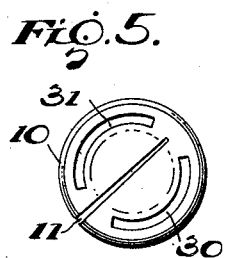
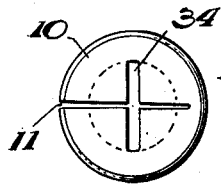
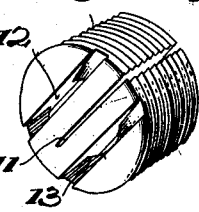
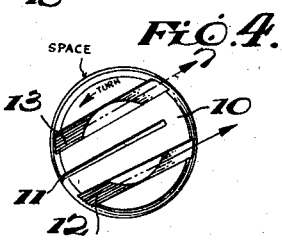
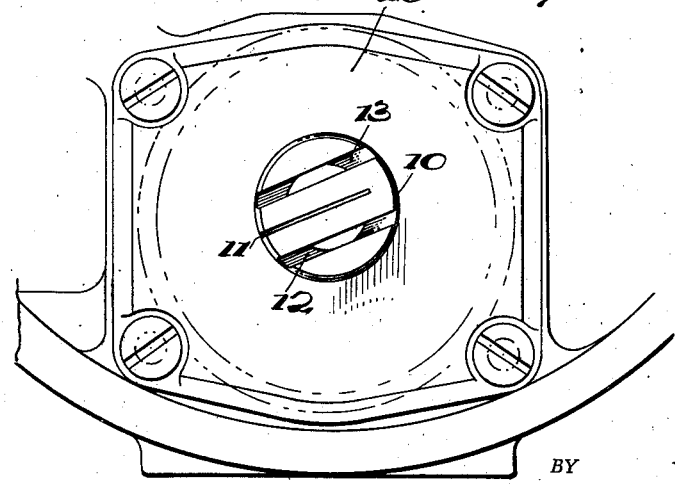
INVENTOR
Donald L. Rankin
BY
ATTORNEY Patented Feb. 5, 1946

2,394,104

UNITED STATES PATENT OFFICE 2,394,104

ADJUSTING SCREW

Donald L. Rankin, Jackson Heights, N. Y., assignor to Bendix Aviation Corporation, Bendix, N. J., a corporation of Delaware Application March 10, 1943, Serial No. 478,711

4 Claims. (Cl. 151—32)

This invention relates to adjustment mechanism for setting and maintaining a predetermined and desired condition and more particularly to a novel adjusting screw adapted for such purpose.

Adjustment mechanisms heretofore provided for setting a predetermined condition, such as, for example, the setting of a gas or oxygen regulator which is designed to operate intermittently and at the same time maintain a certain desired pressure in a given chamber, have been unreliable in that after a number of operations the vibrations, accompanying each operation, caused the adjustment mechanism to reset itself to a point where the predetermined condition was no longer maintained.

An object of the present invention, therefore, is to provide a novel adjustment mechanism adapted to be set for and, thereby, maintain a predetermined and desired condition notwithstanding the intensity and the number of vibrations that the mechanism may encounter.

Another object of the invention is to provide a novel adjusting screw adapted for use in numerous and various applications where the requirement is the accurate maintenance of any predetermined set condition.

A further object of the invention is to provide a novel self-locking adjusting screw which, when once set to maintain a predetermined condition, will reliably maintain such condition notwithstanding any undesirable disturbing forces applied thereto.

Another object of the invention is to provide a novel adjusting screw having, basically, a wedging action whereby any set conditions will be maintained thereby.

A further object of the invention is to provide a novel self-locking adjusting screw readily adaptable for use in substantially inaccessible places where it is either impractical or impossible to use separate locking means to assure the maintenance of a desired and set condition.

Another object is to provide a novel split screw member, adapted for use in presetting and maintaining any predetermined condition, having a pair of tool receiving members thereon, one of which must be engaged to turn the screw in one direction and the other of which must be engaged to turn it in an opposite direction.

A still further object of the invention is to provide a novel adjustment screw which is simple and inexpensive to manufacture and extremely reliable in operation.

The above and further objects and novel features of the invention will appear more fully from the following detailed description when the same is read in connection with the accompanying drawing. It is to be expressly understood, however, that the drawing is for purposes of illustration only and is not intended as a definition of the limits of the invention.

In the drawing wherein like reference characters refer to like parts throughout the several views, Figure 1 is a vertical sectional view of one form of apparatus embodying the subject matter of the present invention;

Figure 2 is a side elevation view of the structure of Figure 1;

Figure 3 is a perspective view of the novel adjusting screw member of the present invention;

Figure 4 is a front elevational view of the novel screw of Figure 3;

Figure 5 is a slightly modified form of the screw of Figure 3;

Figure 6 is a further modified form of the novel screw of the present invention; and, Figure 7 is a still further modification of the novel adjusting screw.

Referring now to the drawing, and more particularly to Figure 3 thereof, the novel screw of the present invention is there shown as comprising an exteriorly threaded body member 10 having a longitudinal cut or slit 11 therein running from the outer periphery of the screw and interiorly thereof to a point beyond the central longitudinal axis of the screw. The screw itself is formed of brass or some other suitable material and possesses a certain amount of inherent resiliency so that with the longitudinal slit therein the screw tends to expand outwardly somewhat or, if desired, the screw may be expanded somewhat by a separate operation during its construction.

A pair of tool receiving or engaging members in the form of slots 12 and 13, adapted for engagement by a screw driver or the like, are provided on the front end of the screw, one of the slots being placed to the left of the longitudinal slit 11 and the other to the right of the slit. Furthermore, the interior of the screw may be provided with a hollow annular chamber 14, as better shown in Figure 1. The novel screw thus described provides a mechanism, heretofore unobtainable, adapted to be set to maintain any preselected condition without destroying such adjustment notwithstanding the amount or intensity of disturbing forces acting thereon.

For a better understanding of the operation and function of the novel adjusting screw of Figure 3, the latter has been illustrated in Figure 1 as applied to a portion of a gas or oxygen regulator to maintain a preselected value of pressure within a chamber 15.

Chamber 15 is defined by an annular wall 16 having an outlet 17 and an inlet 18, the latter being provided with a valve 19. If the structure is used as a part of a demand type of oxygen regulator, it may be desired to maintain the pressure within chamber 15 at about 50 pounds per square inch. This is accomplished by closing annular wall 16 by way of a centrally apertured plate 20 which has secured thereto one end of a bellows 21, the other end of the bellows being fastened to a movable plate 22 having a central boss 23 formed thereon.

The central aperture of plate 20 is threaded internally for the reception of the novel self-locking adjusting screw of the present invention, the inner end of which defines an abutment for a relatively heavy spring 24, the other end of the spring being sleeved about boss 23. The outer end of the boss rests against a resilient bearing element 25 which is carried by annular chamber 14 of the adjusting screw.

Valve 19 is operatively connected with the movable plate 22 of the bellows through a bell-crank 26, pivoted at 27, and a link 28 interconnecting the crank and movable plate.

Assuming that chamber 15 contains oxygen substantially at a pressure of 50 pounds per square inch and the consumer has depleted some of the oxygen therefrom, the pressure drops and as a result bellows 21 expands outwardly to pivot the bell-crank clockwise so that valve 19 is unseated by oxygen entering from a tank supplying inlet 18. As soon as sufficient oxygen has been supplied to chamber 15, bellows 21 collapses swinging the bell-crank in an opposite direction to seat and close valve 19. The foregoing operation continues as long as a consumer uses the apparatus and because of continued operation vibrations are generated which eventually displace ordinary adjusting screws.

If it should become desirable to maintain a pressure of 60 pounds per square inch within chamber 15, slot 12 of screw member 10 (as viewed in Figure 3) is simply engaged by a screw driver or other suitable tool and turned to the right thus loading plate 22 causing bellows 21 to become less sensitive so that more pressure will be required within chamber 15 before bellows 21 will collapse to close valve 19. Thus the pressure within the chamber has been increased and the screw, because of its inherent resiliency and also because of slit 11 expands against the wall of its receptive aperture to maintain the load constant notwithstanding the amount or intensity of vibrations.

Should it become necessary for any reason to maintain a pressure of only 40 pounds per square inch within the chamber, screw member 10 is rotated to the left to release some of the load on plate 22 and, hence, on the bellows whereby the bellows will collapse in response to a lower pressure to close the valve. In rotating screw member 10 to the left, slot 13 must be engaged rather than slot 12.

If any attempt were made to rotate the screw to the left by engaging slot 12 instead of slot 13, the screw would only lock tighter within its receiving member because by engaging slot 12 to promote a turning to the left would tend to simply enlarge slit 11 and the screw would act in the nature of a wedge. By the same token, to rotate the screw to the right, slot 12 must be engaged because if such turning were attempted with the use of slot 13, aperture 11 would enlarge to provide a positive wedge against rotation.

By reason of longitudinal slit 11, therefore, and, further, because of the inherent resiliency of the screw member, once the screw has been adjusted to maintain a predetermined condition, it will do so for the reason that any tendency of the screw to reset itself due to vibrations merely causes the screw to expand outwardly along the longitudinal slit to thereby define a positive and stationary wedge.

The advantages of the above-described novel self-locking adjusting screw are deemed apparent since no separate locking means are required and this is of utmost importance in situations where the necessary adjustment is to be made in a "tight" place. Furthermore, the screw can be adapted for receiving various tools other than a screw driver. For example, slots 12 and 13 may be replaced with the arcuate receiving slots 30 and 31 of Figure 5 or by prongs 32 and 33 of Figure 6. Instead of being prongs, elements 32 and 33 could be annular bores as well, depending upon the tool to be used to impart the desired adjustment. Also, the screw may be formed, as shown in Figure 7, with a single transverse slot 34 extending equally on both sides of slit 11. A small screw driver is needed to operate this screw, the blade of which must be inserted in either half of transverse slot 34 depending upon the desired direction of screw rotation.

The adjusting screw of the present invention has been shown and described above in connection with only one of its applications for the purpose of illustration and description, however, it now will be apparent to those skilled in the art that the adjusting screw is applicable to many and various uses.

Although several embodiments of the present invention have been illustrated and described in detail, it is to be expressly understood that the invention is not limited thereto. Various changes can be made in the design and arrangement of parts without departing from the spirit and scope of the invention as will now be understood by those skilled in the art. For example, the screw in the present illustration has been shown with an interior chamber 14 simply to receive rubber plug 25 yet this is unnecessary and the screw may be completely solid except for the longitudinal slit which would appear in the same manner as shown in the drawing. For a definition of the limits of the invention, reference will be had primarily to the appended claims.

I claim:

1. A threaded lock screw of resilient material having a longitudinal slit along the entire length of one side extending inwardly beyond the central axis of the body of the screw, the body spread apart by expanding the slit, so that the screw will resiliently grip the threaded socket into which it may be threaded, and a pair of turning tool receiving elements each on opposite sides of the slit.

2. A threaded lock screw of resilient material having a longitudinal slit along the entire length of one side extending inwardly beyond the central axis of the body of the screw, the body spread apart by expanding the slit, so that the screw will resiliently grip the threaded socket into which it may be threaded, and a pair of turning tool receiving elements each on opposite sides of the slit, and arranged in line transversely of the slit.

3. A threaded lock screw of resilient material having a longitudinal slit along the entire length of one side extending inwardly beyond the central axis of the body of the screw, the body spread apart by expanding the slit, so that the screw will resiliently grip the threaded socket into which it may be threaded, and a pair of turning tool receiving elements each on opposite sides of the slit, said elements comprising separate slots.

4. A threaded lock screw of resilient material having a longitudinal slit along the entire length of one side extending inwardly beyond the central axis of the body of the screw, the body spread apart by expanding the slit, so that the screw will resiliently grip the threaded socket into which it may be threaded, and a pair of turning tool receiving elements each on opposite sides of the slit, each of said elements comprising a series of holes opposite the slit.

DONALD L. RANKIN.